United States Patent [19]

Zimmer

[11] 4,246,508

[45] Jan. 20, 1981

[54] BRUSH HOLDER ASSEMBLIES FOR SMALL ELECTRIC MOTORS

[75] Inventor: Ralph O. Zimmer, Chicago, Ill.

[73] Assignee: Skil Corporation, Chicago, Ill.

[21] Appl. No.: 972,227

[22] Filed: Dec. 22, 1978

[51] Int. Cl.[3] .............................................. H02K 13/00

[52] U.S. Cl. ...................................... 310/242; 310/249

[58] Field of Search ............... 310/239, 240, 241, 242, 310/245, 246, 247, 249

[56] References Cited

U.S. PATENT DOCUMENTS

| | | | |
|---|---|---|---|
| 3,108,201 | 10/1963 | Summerfield | 310/247 |
| 3,339,098 | 8/1967 | Burrows | 310/24 7 |
| 3,480,814 | 11/1969 | Amrein | 310/247 |
| 3,534,206 | 10/1970 | Carey | 310/247 |
| 3,590,297 | 6/1971 | Smith | 310/239 |
| 3,898,492 | 8/1975 | Vassos | 310/242 |

*Primary Examiner*—R. Skudy

*Attorney, Agent, or Firm*—McDougall, Hersh & Scott

[57] ABSTRACT

Brush holder assemblies are disclosed which prevent the spring, or conductor and terminal connector from protruding out of the brush holder and damaging the motor commutator. The constructions employ a brush housing having a restraining bridge at the front end thereof and a terminal connector having a rearwardly extending flange. As the brush wears down, it and the terminal connector to which it is attached move forwardly in the brush housing under bias of a coil spring. Upon striking the restraining bridge the terminal connector pivots forwardly under tension of the spring thereby wedging the flange against the top of the housing preventing further movement of the brush assembly.

11 Claims, 11 Drawing Figures

BRUSH HOLDER ASSEMBLIES FOR SMALL ELECTRIC MOTORS

BACKGROUND OF THE INVENTION

The present invention relates to brush holder assemblies for electrical motors. More specifically, it relates to brush holder assemblies for use with electrical motors commonly employed in small electric appliances and hand tools, the latter category including, for example, drills, sanders, and saws. In the usual case, such brush assemblies are spring biased to maintain good electrical contact between the carbon brush and the motor commutator. As the carbon brushes wear down, there is a danger of damaging the motor by scoring the commutator if the brush is cast out of the housing and the spring, the terminal connector or the conductor contacts the commutator.

To prevent this kind of damage restraining elements have been developed to prevent movement of the brush assembly after the brush wears down to a predetermined size. Those constructions, however, have not been entirely satisfactory both as to cost and function and, accordingly, there is a need for an improved brush holder construction which achieves the desired objective.

It is accordingly an object of the present invention to provide improved brush holder assemblies which prevent discharge of the spring, terminal connector and conductor from the brush housing to a position where it can damage the motor commutator.

A further object of the invention is to provide improved brush holder assemblies of the type referred to in the preceding paragraph which are low in cost and simple in construction permitting rapid assembly into completed devices.

A further object of the invention is to provide a brush holder terminal connector having an integral mechanism for preventing movement of the terminal connector beyond the brush housing.

A further object of the invention is to provide an improved terminal connector having means for engaging the walls of the brush housing, when the brush has worn down to a predetermined size, to prevent further movement of the brush assembly.

Other objects and advantages of the invention will be apparent from the remaining portion of the specification.

PRIOR ART STATEMENT

In accordance with the provisions of 37 CFR section 1.97, applicant states that the following U.S. patents are the closest prior art of which he is aware: U.S. Pat. No. 3,898,492 to Vassos et al and U.S. Pat. No. 3,108,201 to Summerfield. Vassos et al disclose a current interrupting brush holder assembly in which various mechanisms are employed to electrically disconnect the brush holder and/or brush from the power supply to prevent damage to a motor commutator from the spring or terminal connector. Summerfield discloses a brush holder assembly in which the brush is restrained when the brush wears down to a predetermined size.

DETAILED DESCRIPTION

Figure 1:
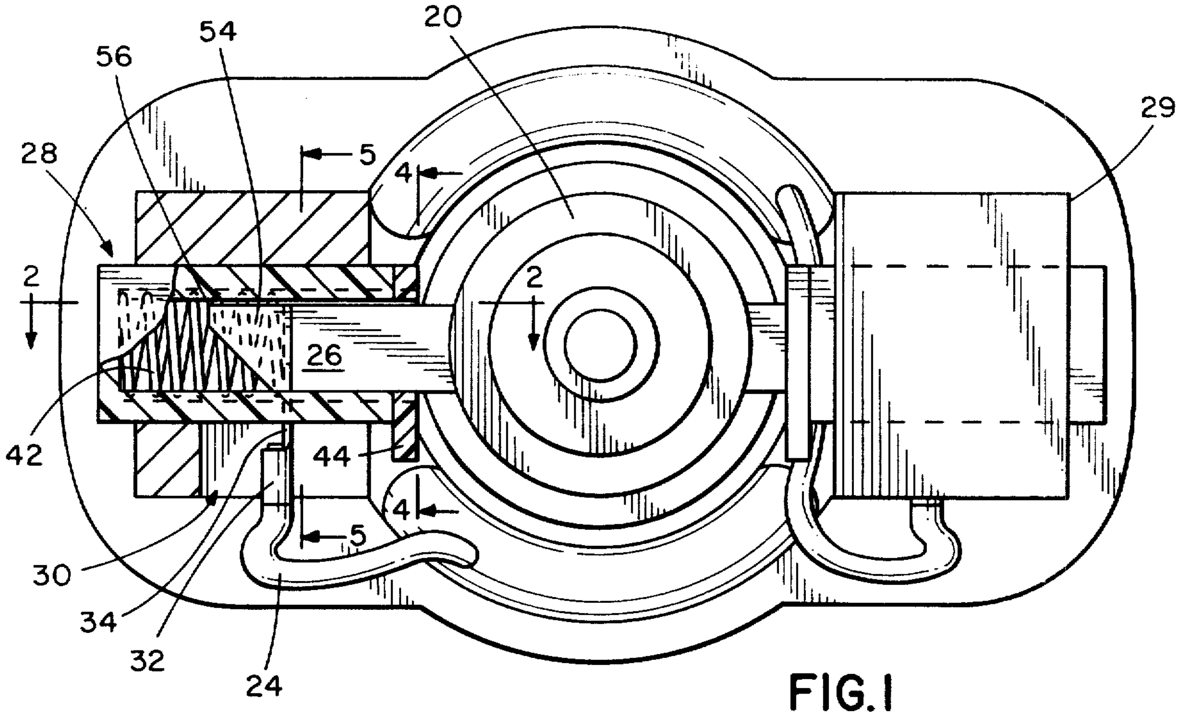
FIG. 1 is an end elevation of a motor commutator showing the positioning of a pair of brush housing assemblies relative thereto, portions of the latter being cut away.

Referring to FIG. 1, there is illustrated the general arrangement of an electric motor including a commutator 20 with appropriate bearings permitting rotation of the commutator relative to the coils. The electric circuit between the coils and the commutator is completed by means of conductor wires 24 and carbon brushes 26. The carbon brushes are positioned in a brush housing 28 on either side of the commutator and maintain a sliding electrical contact with the commutator. The brush housings are secured on either side of the commutator in mounting blocks 29.

FIGS. 1 through 6 illustrate a brush holder assembly according to a first embodiment of the invention. Each conductor 24 is electrically connected to the carbon brushes 26 by means of a terminal connector 30 which has a sleeve portion 32, an intermediate portion 34 and a generally rectangular portion 36.

Figure 5:
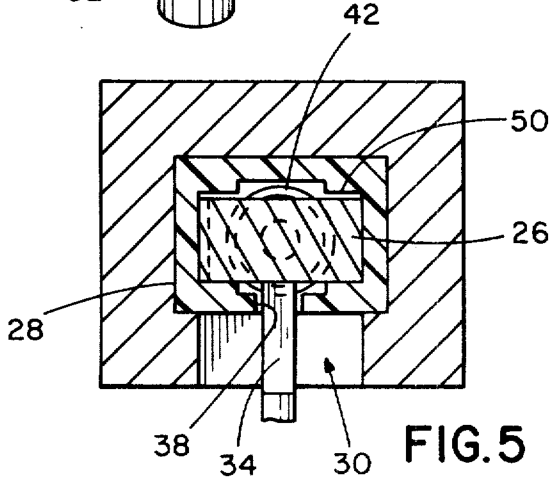
FIG. 5 is a view similar to FIG. 4 along the lines 5—5 of FIG. 1.
Figure 6:
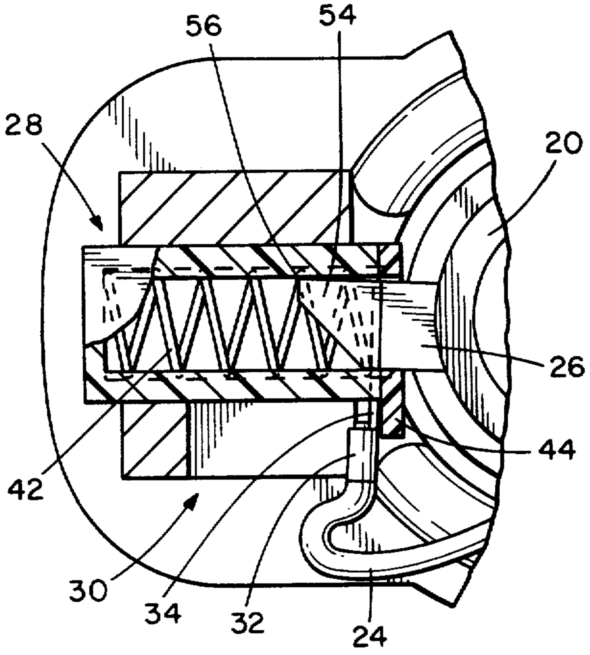
FIG. 6 is a partial view similar to FIG. 1 illustrating the terminal connector of the first embodiment in a wedged or locked position.
Figure 7:
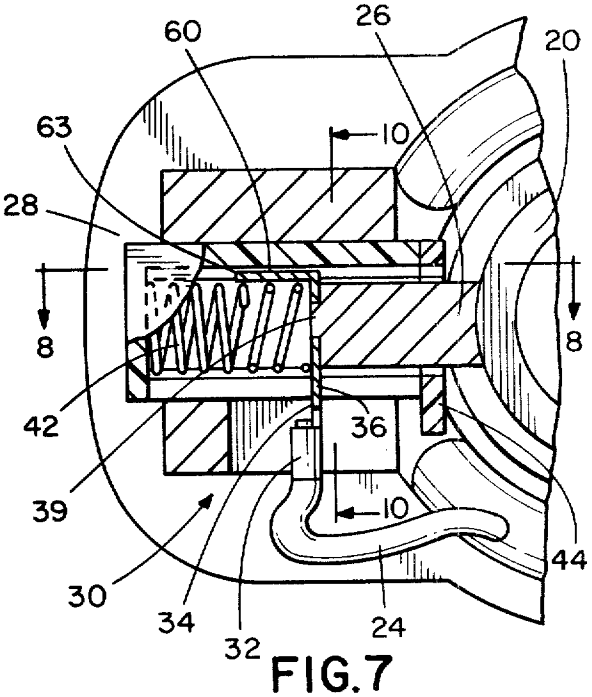
FIG. 7 is a partial view similar to FIG. 1 of a second embodiment of a terminal connector according to the invention.
Figure 8:
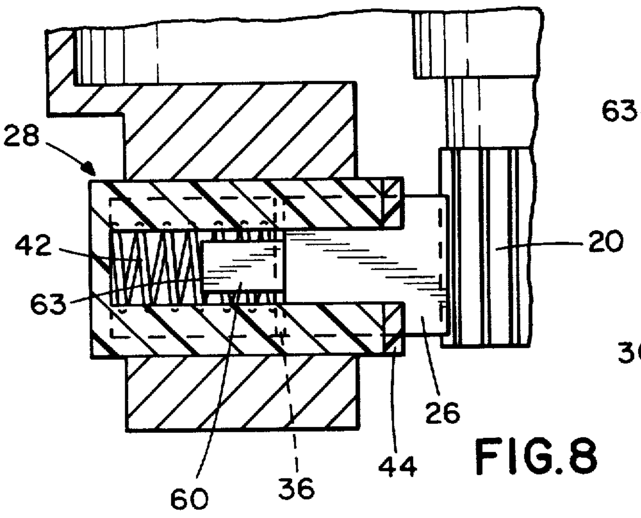
FIG. 8 is a sectional view along the lines 8—8 of FIG. 7.

In the usual case, the end of the conductor 24 has the insulation stripped therefrom and is placed in the sleeve portion 32 where it is crimped, soldered or otherwise secured thereto. The intermediate portion 34 of the terminal connector extends into the brush housing 28 through a channel 38 provided through one wall of the housing (FIG. 5). The rectangular portion of the connector is held against the back of the carbon brush 26 in any appropriate manner as, for example, by the force of coil spring 42 or by a press fit of a brush projection 39 into a central opening in the rectangular portion.

Figure 2:
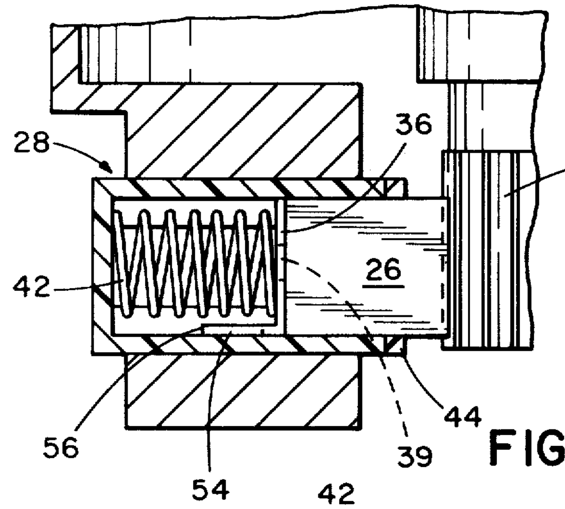
FIG. 2 is a cross sectional view along the lines of 2—2 of FIG. 1 showing the details of the brush housing assembly.
Figure 3:
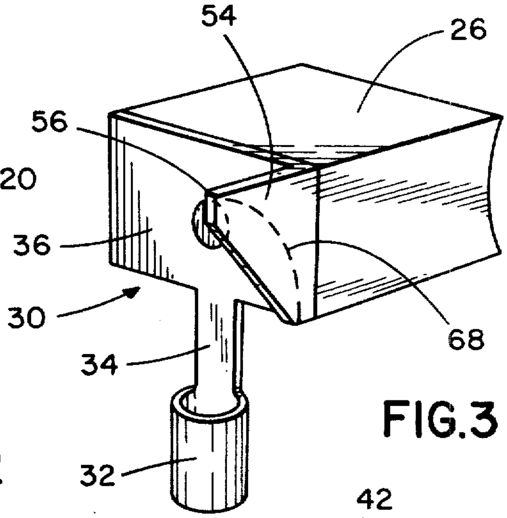
FIG. 3 is a perspective view of the brush and terminal connector according to a first embodiment of the invention.
Figure 4:
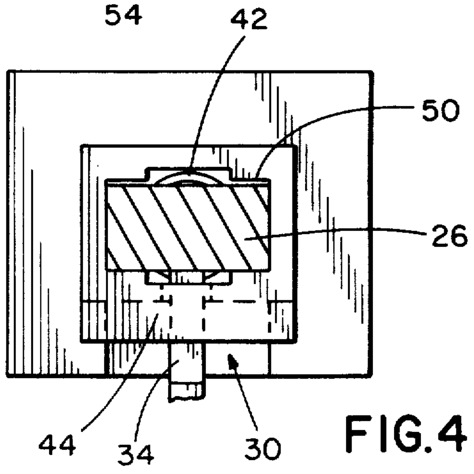
FIG. 4 is a sectional view along the lines 4—4 of FIG. 1.

Referring to FIGS. 2, 4 and 5, it will be seen that the brush housing is generally rectangular in construction, enclosed on all sides with the exception of channel 38 through one wall and the open front which permits the brush 26 to protrude therefrom into engagement with the commutator. Firm contact between the brush and the commutator is obtained by use of the coil spring 42 located between the back of the brush housing and the rectangular portion 36 of the terminal connector. The brush and connector are free to move within the brush housing under the bias of the spring; they are guided within the housing by upper and lower brush tracks or surfaces 50 and 52.

Channel 38 is elongated and extends substantially the entire length of the brush housing permitting the terminal connector to move freely as the brush 26 wears down. Disposed across the front of the brush housing at the lower portion thereof is a restraining bridge 44. The bridge is part of an end plate secured to the housing and is positioned to contact the intermediate portion 34 of the terminal connector when the brush is worn down to the point where it is desired to terminate further forward movement of the brush. Use of restraining bridge 44 as the sole means of terminating forward movement of the brush 26 is undesirable because of the presence of spring 42. On occasion the brush may be entirely absent from the housing; this permits the terminal connector and/or the spring itself to strike the commutator causing damage thereto and unsafe operation.

According to the present invention, a secure locking of the brush and connector against undesired forward movement is obtained by providing a rearwardly extending flange attached to the connector 30. According to the first embodiment (FIG. 5), flange 54, which is generally triangular in shape, extends at a right angle from rectangular portion 34 and acts as a wedge. The flange extends rearwardly from either side of the rectangular portion 36 and includes an engaging end 56 which functions in a manner to be described.

During the normal forward movement of the brush and connector the flange tracks along the housing against brush track 50. When, however, the terminal connector portion 34 engages the restraining portion 44 (FIG. 6), the urging of the coil spring 42 tilts or pivots the top of the rectangular portion 36 forwardly about the fulcrum defined by the bridge 44. This causes the point or end 56 of the flange 54 to strike or wedge against the wall of the brush housing opposite the wall which is adjacent the restraining bridge. This wedging action prevents further forward movement of the brush, terminal connector or spring. The result is a positive locking of the entire assembly safely within the brush housing preventing any possibility of the terminal connector, the lead wire or the coil spring from engaging the commutator should the brush break up or otherwise fall away from the housing as often happens when brush size is reduced to a considerable extent.

Referring now to FIGS. 7 through 11, a second embodiment of the invention is illustrated. For simplicity, those elements of the invention which are the same as the first embodiment have been given the same reference numerals in the drawings. The principal difference between the first and the second embodiment is the location and configuration of the rearwardly directed flange attached to the rectangular portion 36 of the terminal connector 30.

Figure 9:
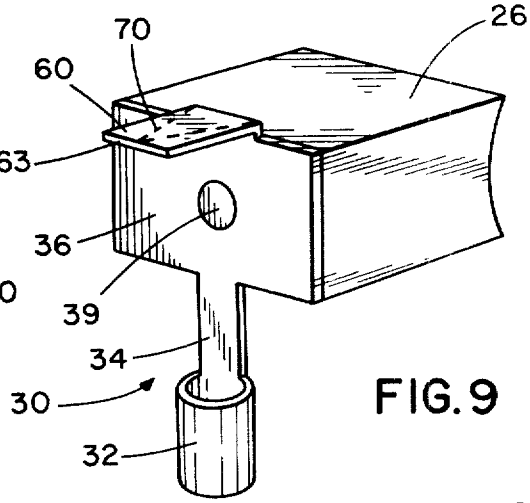
FIG. 9 is a perspective view of a terminal connector according to the second embodiment of the invention.
Figure 10:
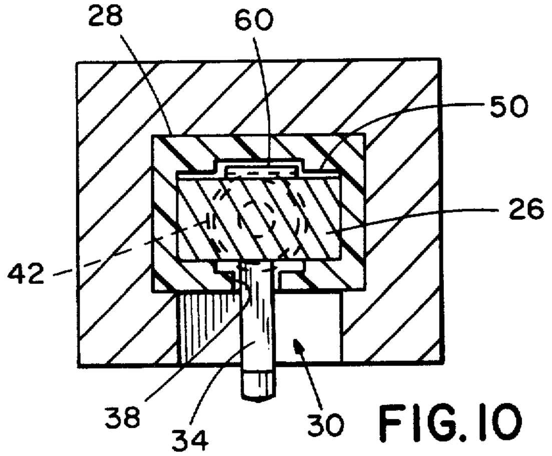
FIG. 10 is a sectional view along the lines 10—10 of FIG. 7.

As illustrated in FIG. 9, the second embodiment employs a rearwardly directed flange 60 mounted on the top of the rectangular portion 36. Flange 60 is itself generally rectangular in configuration. During normal movement of the terminal connector, this flange tracks along the brush housing in a channel 62 dimensioned to receive it.

Figure 11:
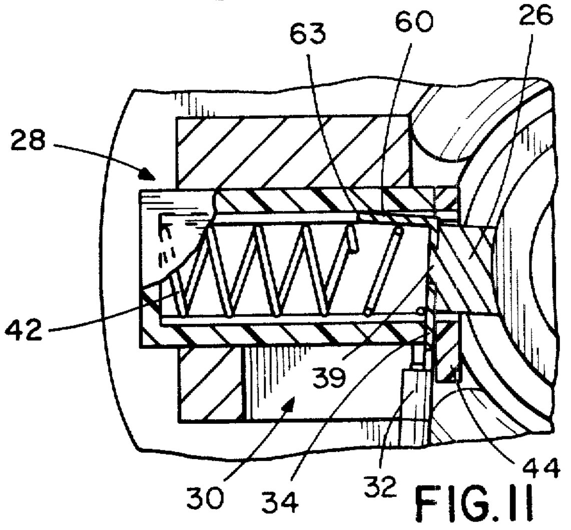
FIG. 11 is a view similar to FIG. 7 showing the second embodiment of a wedged or locked position.

As with the first embodiment, a restraining bridge 44 is positioned at the forward portion of the housing in the path of the intermediate portion 34 of the terminal connector. When the terminal connector strikes the restraining bridge the coil spring 42 again causes forward rotation of the rectangular portion 36 of the terminal connector relative to the bridge 44. This slight rotation, as illustrated in FIG. 11, is effective for causing the end 63 of the flange 60 to engage or wedge against the channel 62 and affirmatively prevent further forward movement of the terminal connector or spring.

The wedging flange may be provided in a variety of forms. With respect to the first embodiment, it will be apparent that the flange 54 can be provided on either side of the rectangular portion 36 and that it need not be triangular shaped; it only needs to include the end surface 56 for engaging a portion of the brush housing generally oppositely disposed to the restraining bridge. For illustrative purposes, the dashed lines 68 (FIG. 3) indicate an arcuate surface joining with the wedging surface 56. Similarly, with respect to the second embodiment, it will be appreciated that the flange 60 can be provided anywhere along the edge of the rectangular portion 36 which is opposite the edge joining the intermediate portion 34. Of course, the configuration of the flange need not be rectangular. For example, a triangular flange, as indicated by the dashed line 70, could also be employed.

While I have shown and described embodiments of this invention in some detail, it will be understood that this description and illustrations are offered merely by way of example, and that the invention is to be limited in scope only by the appended claims.

I claim:

1. A brush holder assembly for small electric motors comprising:

(a) a hollow brush housing open at one end and including a channel extending through one wall thereof in the direction of brush travel, (b) an electrically conducting brush positioned in said housing and dimensioned to extend through the open end of said housing for engaging a commutator, (c) a terminal connector positioned in the housing behind said brush and in electrical contact therewith, said connector including a portion extending outwardly through said channel for electrical connection external to the housing, (d) means for biasing said brush and connector toward said open end, (e) means secured to said housing in the path of movement of said connector portion for pivoting said connector relative to said housing when the brush wears down to a selected size, and (f) flange means attached to said terminal connector for wedging said connector against said housing in response to pivoting movement of the former to prevent further movement of the brush, connector and biasing means toward the open end of the housing.

2. A brush holder assembly for small electric motors comprising:

(a) a hollow brush housing open at one end and including a channel extending through one wall thereof in the direction of brush travel, (b) an electrically conducting brush positioned in said housing and dimensioned to extend through the open end of said housing for engaging a commutator, (c) a terminal connector positioned in the housing behind said brush and in electrical contact therewith, said connector including a portion extending outwardly through said channel for electrical connection external to the housing, (d) means for biasing said brush and connector toward said open end, (e) means secured to said housing in the path of movement of said connector portion for pivoting said connector relative to said housing when the brush wears down to a selected size, and (f) means for wedging said connector against said housing in response to pivoting movement of the former to prevent further movement of the brush, connector and biasing means toward the open end of the housing wherein said means for wedging includes:

a flange attached to said terminal connector and extending in a direction away from the open end of the brush housing, said flange having a surface adapted to engage the housing when the connector is pivoted thereby wedging the connector against the housing.

3. The brush holder assembly according to claim 1 wherein said means for pivoting includes:

a bridge member secured to said housing at the open end of the latter and disposed across said channel, said bridge member restraining movement of the portion of said terminal connector extending through said channel when the brush has worn down to said selected size whereby the portion of the terminal connector in said housing is pivoted relative to the bridge member.

4. The brush holder assembly according to claim 1 wherein said flange means includes:

a flange attached to said terminal connector and extending in a direction away from the open end of the housing, said flange having a surface for engaging the wall opposite said one wall thereby to wedge said connector in said housing.

5. The brush holder assembly according to claim 2 or claim 9 wherein said flange is attached to said terminal connector in an orientation perpendicular to said one wall and during pivoting engages the wall of said housing opposite said one wall.

6. The brush holder assembly according to claim 2 or claim 9 wherein said flange is attached to said terminal connector in an orientation parallel but spaced from said one wall and during pivoting engages the wall of said housing opposite said one wall.

7. The brush holder assembly according to claim 1 wherein said terminal connector includes:

(a) a first portion disposed within the housing, (b) a sleeve portion outside the housing for external connection to an electrical circuit, and (c) an intermediate portion extending through said housing channel and connecting said first portion with said sleeve portion.

8. The brush holder assembly according to claim 3 wherein said terminal connector includes:

(a) a first portion disposed within the housing, (b) a sleeve portion outside the housing for external connection to an electrical circuit, and (c) an intermediate portion extending through said housing channel and connecting said first portion with said sleeve portion, said intermediate portion engaging said bridge member to initiate pivoting of said terminal connector.

9. The brush holder assembly according to claim 7 wherein said flange means for wedging includes:

a flange attached to said first portion of said terminal connector and extending in a direction away from the open end of said brush housing, said flange having a surface adapted to engage the housing for wedging the connector against the housing when the terminal connector is pivoted.

10. The brush holder assembly according to claim 1 wherein said biasing means is a coil spring.

11. The brush holder assembly according to claim 1 wherein said housing is rectangular and said brush and terminal connector move in said housing along track surfaces provided on said one wall and the wall opposite said one wall.

* * * * *